(12) United States Patent
Nijenhuis (10) Patent No.: US 10,266,283 B2
(45) Date of Patent: Apr. 23, 2019

(54) PAYLOAD TRANSPORT STABILIZER, VEHICLE AND METHOD

(71) Applicant: Nederlandse Organisatie voor toegepast-natuurwetenschappelijk onderzoek TNO, 's-Gravenhage (NL)

(72) Inventor: Jan Nijenhuis, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 528 days.

(21) Appl. No.: 14/655,983

(22) PCT Filed: Dec. 24, 2013

(86) PCT No.: PCT/NL2013/050952
§ 371 (c)(1),
(2) Date: Jun. 26, 2015

(87) PCT Pub. No.: WO2014/104885
PCT Pub. Date: Jul. 3, 2014

(65) Prior Publication Data
US 2015/0336686 A1  Nov. 26, 2015

(30) Foreign Application Priority Data
Dec. 28, 2012 (EP) .................................. 12199600

(51) Int. Cl.
*B64G 1/64* (2006.01)
*F16M 11/12* (2006.01)

(52) U.S. Cl.
CPC ........... *B64G 1/641* (2013.01); *F16M 11/121* (2013.01); *F16M 2200/041* (2013.01); *F16M 2200/063* (2013.01)

(58) Field of Classification Search
CPC ................. B64G 1/641; F16M 11/121; F16M 2200/041; F16M 2200/063
(Continued)

(56) References Cited

U.S. PATENT DOCUMENTS 3,640,555 A * 2/1972 Raschke .................. B66C 1/34
248/331
5,316,260 A * 5/1994 Johnston .................. A61B 3/18
248/123.2

(Continued)

FOREIGN PATENT DOCUMENTS

EP  0656194 A1  6/1995

OTHER PUBLICATIONS

International Search Report and Written Opinion—PCT/NL2013/050952—dated Mar. 9, 2015.

*Primary Examiner* — Michael Safavi
(74) *Attorney, Agent, or Firm* — Banner & Witcoff, Ltd.

(57) ABSTRACT

A payload transport stabilizer (1), comprising: a frame (10); a payload assembly (100), including a payload guide (104) that is connected to the frame (10) and that defines a payload guide path (106), and a payload (102) that is connected to the payload guide such that it is moveable along the payload guide path; a balance mass assembly (200), including a balance mass guide (204) that is connected to the frame (10) and that defines a balance mass guide path (206), and a balance mass (202) that is connected to the balance mass guide such that it is moveable along the balance mass guide path; a coupling mechanism (300, 400) that interconnects the payload (102) and the balance mass (202), such that positions of the payload and the balance mass along their respective guide paths (106, 206) are mutually coupled.

22 Claims, 8 Drawing Sheets

(58) Field of Classification Search
USPC ...... 248/648; 244/173.1, 173.2, 118.1, 118.2
See application file for complete search history.

(56) References Cited

U.S. PATENT DOCUMENTS

| | | | | |
|---|---|---|---|---|
| 5,667,186 | A * | 9/1997 | Luber | F16M 11/08 |
| | | | | 248/550 |
| 6,702,050 | B1 * | 3/2004 | Mazhar | B62D 55/07 |
| | | | | 180/10 |
| 2002/0033796 | A1 | 3/2002 | Chatenet | |
| 2004/0262490 | A1 * | 12/2004 | King, Jr. | B66F 7/0658 |
| | | | | 248/648 |
| 2014/0034775 | A1 * | 2/2014 | Hutson | B64C 39/024 |
| | | | | 244/17.17 |
| 2014/0084131 | A1 * | 3/2014 | Sim | B25J 19/002 |
| | | | | 248/648 |

* cited by examiner

PAYLOAD TRANSPORT STABILIZER, VEHICLE AND METHOD

CROSS-REFERENCE TO RELATED APPLICATIONS

This application is a U.S. National Stage application under 35 U.S.C. § 371 of International Application PCT/NL2013/050952 (published as WO 2014/104885 A1), filed Dec. 24, 2013, which claims priority to Application EP 12199600.3, filed Dec. 28, 2012. Benefit of the filing date of each of these prior applications is hereby claimed. Each of these prior applications is hereby incorporated by reference in its entirety.

FIELD OF THE INVENTION

The present invention relates to a payload transport stabilizer suitable for stabilizing a payload during transport, in particular during a spacecraft launch. The invention also relates to a vehicle and a method.

BACKGROUND

During the launch of a spacecraft, its payload, such as for example sensitive scientific measurement equipment, may need to be protected against the effects of violent, possibly resonant vibrations and quasi-static accelerations. This is particularly true when the payload includes delicate moveable parts, e.g. parts that serve the operation of the payload by being accurately displaceable.

To protect a payload from damage, one may use a so-called 'launch lock'. A launch lock may typically rigidly hold a moveable (part of a) payload in place relative to the spacecraft to prevent it from being smashed into the stops that define the extremities of its range of motion during launch. After launch, the (part of the) payload may be released from its fixed state through the use of bolt cutters, pyrotechnic bolts, Frangibolts and the like, and be rendered movable again.

US2002/0033796 discloses a pointing device for supporting and pointing loads. For stabilization and pointing the device includes moving link means that comprise at least three distinct link arms distributed around the load, each link arm comprising a flexible element having a first end connected to a support element via a first hinge having a single degree of freedom. FIG. 5 of this documents shows two pointing devices, interconnected via a turntable to point the devices in a synchronous manner.

EP0656194 discloses a stand for a surgical microscope having an intermediary portion of a retaining link mechanism consisting of first and second parallel links which interlock each other. A counterweight is provided, for balance adjustment in accordance with a change of the weight of the microscope, for example when auxiliary devices are attached to the microscope.

SUMMARY OF THE INVENTION

One drawback of conventional launch locks is that their release mechanisms may be unreliable. Due to temperature variations, vacuum exposure and intense mechanical vibrations to which a launch lock is subjected during launch, a release mechanism may break or get stuck permanently, for instance as a result of cold welding. This is obviously undesirable since it may render a costly payload useless. Furthermore, the degree of (un)reliability of a launch lock is hard to assess accurately, since the number of deployments under real-life circumstances are too few for reliable statistics.

Another drawback is that re-locking the movable part of the payload, for instance for a return to earth, is often impossible due to the one-way nature of the release mechanism.

It is an object of the present invention to provide for a payload transport stabilizer that is capable of stabilizing an object/payload during transport, and that may serve as an alternative launch lock mechanism that overcomes the aforementioned problems.

To this end, one aspect of the present invention is directed to a payload transport stabilizer. The payload transport stabilizer may comprise a frame. The payload transport stabilizer may also comprise a payload assembly, which may include a payload guide that is connected to the frame and that defines a payload guide path. The payload assembly may also include a payload that is connected to/associated with the payload guide such that it (and in particular its center of mass) is moveable along the payload guide path, particularly between a first payload position and at least a second payload position. The payload transport stabilizer may further comprise a balance mass assembly, which may include a balance mass guide that is connected to the frame and that defines a balance mass guide path. The balance mass assembly may also include a balance mass that is connected to/associated with the balance mass guide such that it (and in particular its center of mass) is moveable along the balance mass guide path. The balance mass may be movable along the balance mass guide path between a first balance mass position and at least a second balance mass position. The payload transport stabilizer may further include a coupling mechanism that interconnects the payload and the balance mass, such that positions of the payload and the balance mass along their respective guide paths are mutually coupled.

The payload transport stabilizer may be configured such that it defines (or occupies) at least one stabilized state, itself defined by a combination of a position of the payload along the payload guide path and a corresponding position of the balance mass along the balance mass guide path, in which stabilized state an acceleration of the frame causes the payload and the balance mass to act one another via the coupling mechanism, such that movement of the payload along the payload guide path (and movement of the balance mass along the balance mass guide path) due to said acceleration is(/are) prevented For example, according to an aspect, the payload is movable along the guide path in a first direction, from its first (e.g. initial, stabilized) position to a second position, wherein the coupling mechanism is configured to move the balance mass in a second direction that is opposite to said first direction when the payload moves in the first direction. Particularly, the movement of the balance mass counteracts the movement of the payload, therefore stabilizing the payload with respect to a mutual reference frame.

The preferably exclusively mechanical coupling mechanism may take different forms in different embodiments. In one embodiment, for instance, the coupling mechanism may include a parallelogram linkage, including four links connected in a loop by four joints. The joints of a first pair of opposite joints may be connected to the payload and the balance mass, respectively, while the joints of a second pair of opposite joints may be movably connected to the frame (so as to constrain their motion to a predetermined path). In another embodiment the coupling mechanism may comprises a lever linkage, for instance a first class lever-linkage, including a lever that is rotatably connected to the frame through a fulcrum and that defines a payload arm and a balance arm. The payload arm is may be linked to the payload whereas the balance arm may be linked to the balance mass, such that position of the payload and the balance mass along their respective guide paths are mutually coupled through the lever.

The operation of the presently disclosed payload transport stabilizer may be understood as follows. An accelerating spacecraft may represent a non-inertial reference frame in which all bodies of mass carried by the spacecraft, such as a payload, appear to be subject to respective inertial forces. Under the influence of these inertial forces the spacecraft and the payload may develop relative movement, which may cause damage to either one of them, and in particular to the latter. The payload transport stabilizer according to the present invention is partly based on the understanding that an inertial force on a moveable payload may be offset by a parallel inertial force on a likewise moveable balance mass by coupling the payload and the balance mass through a coupling mechanism, such as, for instance, the aforementioned parallelogram linkage or lever linkage. The coupling mechanism may ensure that both translational and rotational accelerations of the spacecraft, which may be fixedly connected to the frame of the payload transport stabilizer, do not result in relative motion between the payload and the spacecraft/frame. For example, in an embodiment wherein the coupling mechanism includes a lever linkage of the above-mentioned type, the payload transport stabilizer may be configured to cause the payload and the balance mass to exert moments of equal magnitude and opposite direction on the lever around the fulcrum (zero-moments are considered to satisfy this condition), so as to prevent rotation of the lever and thus relative movement between the payload and the spacecraft.

Accordingly, with a properly configured payload transport stabilizer according to the present disclosure, a payload need not be rigidly fixed relative to the spacecraft to prevent it from unintentionally moving relative thereto. This overcomes both the release and the re-locking issue. In addition, the load lock assembly offers an advantage in that it enables deliberate movement of the payload relative to the spacecraft by reacting against the balance mass. This is particularly practical in space satellite applications, wherein movement of the payload may thus be effected without causing reaction forces that move the satellite structure that accommodates the payload, and without changing the position of the center of mass the satellite as a whole.

As regards the terminology used in this text, it is noted that the term "stabilized state" may be construed to refer to a state of the payload transport stabilizer in which at least one of (i) a translational acceleration of the frame of the payload transport stabilizer, in particular a translational acceleration having a non-zero directional component parallel to a tangent of the payload guide path at the current position of the payload along said path, and (ii) a rotational acceleration of the frame of the payload transport stabilizer, in particular a rotational acceleration around the current common center of mass of the payload and the balance mass, does not cause movement of the payload relative to the frame. Accordingly, a stabilized state may provide for a payload lock with respect to one or more types of translational and/or rotational accelerations. Furthermore, the configuration of a payload transport stabilizer may allow for multiple, mutually different stabilized states, each of which may typically be uniquely characterized by a combination of the position of the payload along the payload guide path and the position of the balance mass along the balance mass guide path. Different stabilized states may provide for a payload lock with respect to the same type(s) of accelerations or different type(s) of accelerations.

One embodiment of the payload transport stabilizer according to the present disclosure may be configured to define no more than one stabilized state. However, to render the operation of the payload transport stabilizer more robust and resistant to accidental deviations from said one stabilized state, a preferred embodiment of the payload transport stabilizer may be configured such that a continuous range of positions of the payload along the payload guide path corresponds to a continuum of mutually different stabilized states. In such an embodiment, each stabilized state associated with the continuous range may be directly accessible from another stabilized state associated with that range, i.e. without passing through a non-stabilized state. Hence, in case the payload transport stabilizer accidentally shifts out of a selected stabilized state, it may end up in another, and the effective status quo of the payload transport stabilizer may be maintained. This is in particular true in case the stabilized states of the stabilized state continuum all provide for a payload lock with respect to the same types of translational and/or rotational accelerations.

A payload transport stabilizer featuring a stabilized state continuum may possess a high level of symmetry so as to enhance its functionality and reduce the complexity of its design. In preferred embodiments of the payload transport stabilizer, the symmetry may entail one or more of following aspects:

The construction of the payload assembly and the balance mass assembly may be generally symmetrical, or even identical. This may in particular apply to the masses of the payload and the balance mass, and to the shape of the payload and balance mass guide paths. That is, the payload and the balance mass may preferably have a substantially same mass [kg], while the payload guide path and the balance mass guide path may preferably be congruent. In one embodiment, for instance, both the payload guide path and the balance mass guide path may be linear. The linear guide paths may preferably extend in parallel, and more preferably be in alignment.

Overall, the configuration of the payload transport stabilizer may be such that, for displacements of the payload along the payload guide path, a product of a vector displacement $\Delta_{Spayload}$ of the payload and the mass of the payload $m_{payload}$ is equal but opposite in sign to a product of a corresponding vector displacement $\Delta_{Sbalance\_mass}$ of the balance mass along the balance mass guide path and a mass of the balance mass $m_{balance\_mass}$, i.e. such that $\Delta_{Spayload} * m_{payload} = -\Delta_{Sbalance\_mass} * m_{balance\_mass}$. In such a configuration, coupled movement of the payload and the balance mass along their respective paths, for example shifting the payload transport stabilizer from one stabilized state into another, may be effected without affecting the position of the center of mass of the payload transport stabilizer.

In a further embodiment the payload transport stabilizer may include an actuator, in particular an electromagnetic actuator (e.g. a voice coil actuator, a linear motor, an induction motor, etc.), configured to effect movement of the payload along the payload guide path. In an embodiment featuring a coupling mechanism including a lever linkage, for instance, the actuator may comprise an electromotor integrated into the lever linkage, and be configured to rotate the lever around the fulcrum. In another embodiment, the actuator may include two magnets, at least one of which may provide for a variable magnetic field. One of the magnets may, for example, include a permanent magnet, while the other may include an electromagnet, for instance including an electric coil (e.g. a voice-coil arrangement). One of the magnets may be connected, directly of indirectly, to one of the payload and the balance mass, while the other may be connected, directly or indirectly, to the other of the payload and the balance mass, such that varying the magnetic field of the at least one variable magnet may cause the payload and the balance mass to be drawn towards each other or, alternatively, be driven away from each other. The actuator may be operably connected to a controller configured to operate it. Advantageously, the actuator may not only be used to effect movement of the payload along the payload guide path, but also to prevent such movement. In an actuator including a permanent magnet and an electromagnet for instance, the coil of the electromagnet may be short-circuited during transport/launch so as to form an electrical ballast that 'cushions' any undesired movement of the payload and balance mass and prevents resonating vibrations.

It is understood that the payload transport stabilizer according to the present disclosure is generally suitable for stabilizing objects during displacement, beit by means of an aircraft, a spacecraft, a road vehicle, a boat, or another means of transportation. Accordingly, the term 'payload' as used in this text may be construed broadly as 'a cargo-piece of interest', and should not be confined to its more restrictive meaning of a part of cargo earning revenue in an air- or spacecraft.

Further, there is provided a method for stabilizing a payload in a vehicle according to the invention, wherein the vehicle is a spacecraft, the method including:
  accelerating the spacecraft,
  exerting forces on the coupling mechanism, by each of the payload and the balance mass, as a result of the acceleration of the spacecraft, wherein said forces counteract each other, and particularly cancel each outer out. As a result, both the balance mass and the payload, albeit being movable along respective guide paths, will be prevented from such movement during the acceleration of the spacecraft.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
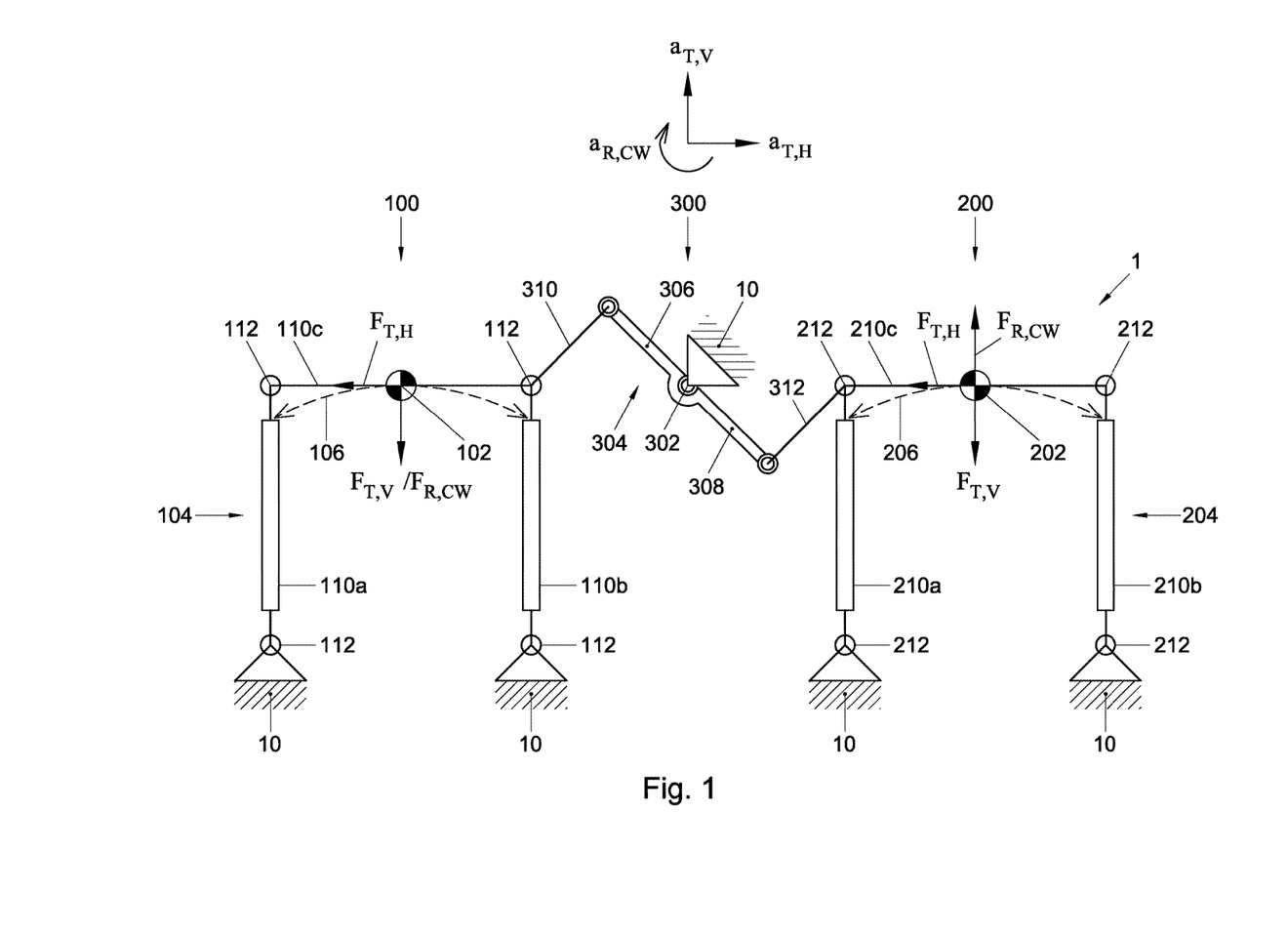
FIG. 1 schematically illustrates a first exemplary embodiment of the payload transport stabilizer according to the present disclosure.

FIG. 1 schematically illustrates a first exemplary embodiment of a payload transport stabilizer 1 according to the present disclosure. The payload transport stabilizer 1 includes a frame 10, a payload assembly 100, a balance mass assembly 200, and a first class lever-linkage 300.

The frame 10 serves to fix and spatially position the other components 100, 200, 300 of the assembly 1 relative to each other, and may therefore be generally rigid. In FIG. 1, the frame 10 is each time illustrated by a patch of hatching, which patches are understood to refer to the same frame 10. In use, the frame 10 may be rigidly connected to the body of a spacecraft, and be considered to form a part thereof.

The payload assembly 100 and the balance mass assembly 200 may have an identical construction, except that the payload assembly 100 may include a payload 102 where the balance mass assembly 200 includes a balance mass 202. The construction of both assemblies 100, 200 is therefore discussed below in terms of the payload assembly 100, with the understanding that the discussion is mutatis mutandis applicable to the balance mass assembly 200, for which case the reference numerals need to be increased by +100.

The payload assembly 100 includes a payload guide 104 including three equally long rigid rods 110a, 110b, 110c, each of which is provided with hinges 112 at its respective extremities. A first 110a and second 110b of the rods are hingedly connected to the frame 10 at one of their respective ends, with said ends spaced apart the length of the third rod 100c. The third rod 110c is hingedly connected in between their other respective ends. Accordingly, if the frame 10 is considered to fulfill the role of a fourth rod, the rods 110a-c of the payload guide 100 and the frame 10 may be regarded to define a parallelogram. Relative to the frame 10 the three sides of the parallelogram formed by the three rods 110a-c are movable, such that the parallelogram is at least partially collapsible. The payload assembly 100 also includes a payload 102, which is mounted onto the third rod 110c. For convenience of exposition FIG. 1 depicts the payload 102 as a point mass.

The first class lever-linkage 300 includes a generally straight, elongate lever 304, whose center is mounted to the frame 10 through a fulcrum 302, disposed symmetrically between the payload assembly 100 and the balance mass assembly 200. The lever 304 thus defines a payload arm 306 and an equally long balance mass arm 308, which extend in opposite directions (i.e. in alignment) from the fulcrum 302. An outer, free extremity of the payload arm 306 is pivotally linked to a proximal extremity of the third rod 110c of the payload assembly 100, and hence to the payload 102 mounted thereon, through a payload link rod 310. Similarly, an outer, free extremity of the balance mass arm 308 is pivotally linked to a proximal extremity of the third rod 210c of the balance mass assembly 200, and hence to the balance mass 202 mounted thereon, through a balance mass link rod 312. For clarity it is noted that each of the link rods 310, 312 is hingedly connected at both its ends.

It will be clear from FIG. 1 that the first class lever-linkage 300 couples the position and motion of the payload 102 to the position and motion of the balance mass 202. Turning the lever 304 counterclockwise around the fulcrum 302 through about ninety degrees from its depicted rotational position, for example, will cause the payload 102 and the balance mass 202 to first move away from one another, and then towards one another. More precisely, it can be seen from the parallelogram construction of the payload guide 100 that the motion of the payload 102 is confined to a payload guide path 106 in the shape of an arc of a circle. In FIG. 1, the apex of the arc coincides with the position of the payload 102. The same applies mutatis mutandis to the motion of the balance mass 202. Accordingly, turning the lever 304 counterclockwise as described, will cause the payload 102 to first move counterclockwise, and subsequently clockwise along the circularly-arced payload guide path 106, while the balance mass 202 first moves clockwise, and subsequently counterclockwise along the balance mass guide path 206. It should be noted that the mechanical system of the payload transport stabilizer 1 is determinate in that a certain position of the payload 102 along the payload guide path 106 necessarily corresponds to a certain position of the balance mass 202 along the balance mass guide path 206, and vice versa.

It also follows from the drawings that the payload 102 is movable along its guide path in a first direction, from its first initial-position to at least a second position, and that the balance mass 202 is movable along its guide path (e.g. in a second direction, from an initial first position to at least a second balance mass position), wherein the coupling mechanism is configured to move the balance mass 202 in a second direction that is opposite to said first direction when the payload 102 moves in the first direction.

Turning now to the basic operation of the embodiment of the payload transport stabilizer 1 shown in FIG. 1 (with the payload and balance mass being in respective first positions). In FIG. 1, the payload transport stabilizer 1 is shown in an initial state of mechanical equilibrium; all its parts may be considered to be at rest relative to each other. Let us now assume that the frame 10 of the payload transport stabilizer 1 is subjected to an acceleration $\alpha_{T,H}$ to the right. In the non-inertial frame of reference of the frame 10, this causes inertial forces $F_{T,H}$ to act on both payload 102 and the balance mass 202. If both have a same mass [kg], the inertial forces $F_{T,H}$ are equal in magnitude and direction, and both point to the left. Via the payload link rod 310, the inertial force on the payload 102 exerts a counterclockwise moment on the lever 304 around the fulcrum 302. Symmetry dictates, however, that a moment of equal magnitude and clockwise direction is exerted on the lever 304 around the fulcrum 302 by the balance mass 202. Accordingly, the net moment on the lever 304 around the fulcrum 302 is zero, which implies that the lever 304 will not rotate and the payload 102 and the balance mass 202 will retain their positions along their respective guide paths 106, 206 (albeit being movable along those paths as such) and relative to the frame 10.

If we further assume that the frame 10 of the payload transport stabilizer 1 is subjected to an upward translational acceleration $\alpha_{T,V}$, either in addition to the above rightward translational acceleration $\alpha_{T,H}$ or instead thereof, it can be seen that, in the non-inertial frame of reference of the frame 10, downwardly directed inertial forces $F_{T,V}$ of equal magnitude and direction act on both the payload 102 and the balance mass 202. The inertial force $F_{T,V}$ on the payload 102 is perpendicular to the tangent to the payload guide path 106 at the position of the payload 102, and will therefore not cause movement of the payload 102 along the guide path 106. The same applies mutatis mutandis to the inertial force $F_{T,V}$ acting on the balance mass 202. Because the inertial forces $F_{T,V}$ on the payload 102 and the balance mass 202 are balanced by the rigid rods 110a-c, 210a-c of the payload guide 104 and balance mass guide 204, respectively, the upward translational acceleration $\alpha_{T,V}$ of the frame 10 will not lead to any alterations in the relative positions of the payload transport stabilizer's movable components.

If we still further assume that the frame 10 of the payload transport stabilizer 1 is subjected to a clockwise rotational acceleration $\alpha_{R,CW}$ around the fulcrum 302, either in addition to the above rightward and/or upward translational accelerations $a_{T,H}$, $a_{T,V}$ or instead thereof, it can be seen that, in the non-inertial frame of reference of the frame 10, inertial forces $F_{R,CW}$ of equal magnitude but opposite direction act on the payload 102 and the balance mass 202. The inertial force $F_{R,CW}$ on the payload 102 is directed downward, while the inertial force $F_{R,CW}$ on the balance mass 202 is directed upward. By the same reasoning as for the upwardly accelerating frame 10 it may be concluded that these forces $F_{R,CW}$ will not cause relative movement of the payload 102 and the balance mass, and thus not affect the relative positions of the components of the payload transport stabilizer 1.

In summary, the payload transport stabilizer 1 of FIG. 1 may lock the payload 102 against movement relative to the frame 10 if the latter experiences translational accelerations in the plane of the drawing, and/or rotational accelerations around the fulcrum 302. The payload transport stabilizer 1 as depicted in FIG. 1 is therefore in a stabilized state for all said types of accelerations.

If, however, the lever 304 is rotated from its depicted orientation, either clockwise or counterclockwise around the fulcrum 302, such that the payload 102 and balance mass 202 are displaced along their respective guide paths 106, 206, the perfect/theoretical symmetry in the configuration is broken (the payload and balance mass guide 104, 204 both fold downwardly, but at different rates, which is due to the configuration of the first class lever-linkage 300). As a result, the payload transport stabilizer 1 shifts into a non-stabilized state for both translational accelerations and rotational accelerations around the fulcrum. In practice, small deviations from the configuration of perfect symmetry may be acceptable and still provide for states in which the stabilizer may be regarded substantially stabilized; such small deviations may involve horizontal strokes/displacements of the payload and the balance mass that are small (e.g. <5%) relative to a length of the rods 110, 210.

It is important to note that the lever 304 of the payload transport stabilizer 1 of FIG. 1 may assume various rotational positions relative to the frame 10, some of which define a stabilized state and some of which do not.

More specifically, it should be noted that there is no continuous range of rotational positions of the lever 304 that corresponds to a plurality of different stabilized states (in this context, an individual stabilized state may be defined by a unique association between a certain position of the payload 102 along the payload guide path 106 and a corresponding position of the balance mass 202 along the balance mass guide path 206). Instead, the rotational positions of the lever 304 that correspond to a stabilized state all correspond to the same stabilized state, and this stabilized state can be reached only from a non-stabilized state. Or phrased otherwise, in case the payload transport stabilizer 1 accidentally leaves the stabilized state, for instance due to a rotational acceleration around a point other than the fulcrum 302, it automatically ends up in a non-stabilized state in which it no longer prevents the payload 102 from moving relative to the frame 10 when subjected to translational accelerations. This is obviously undesirable. Practical embodiments of the payload transport stabilizer 1 may therefore preferably be configured such that a continuous range of rotational positions of the lever 304 relative to the frame 10 defines a continuum of stabilized states, so as to render the operation of the assembly more robust to accidental deviations from a certain stabilized state. An example of such a practical embodiment will be described below with reference to FIGS. 4-7.

Figure 2:
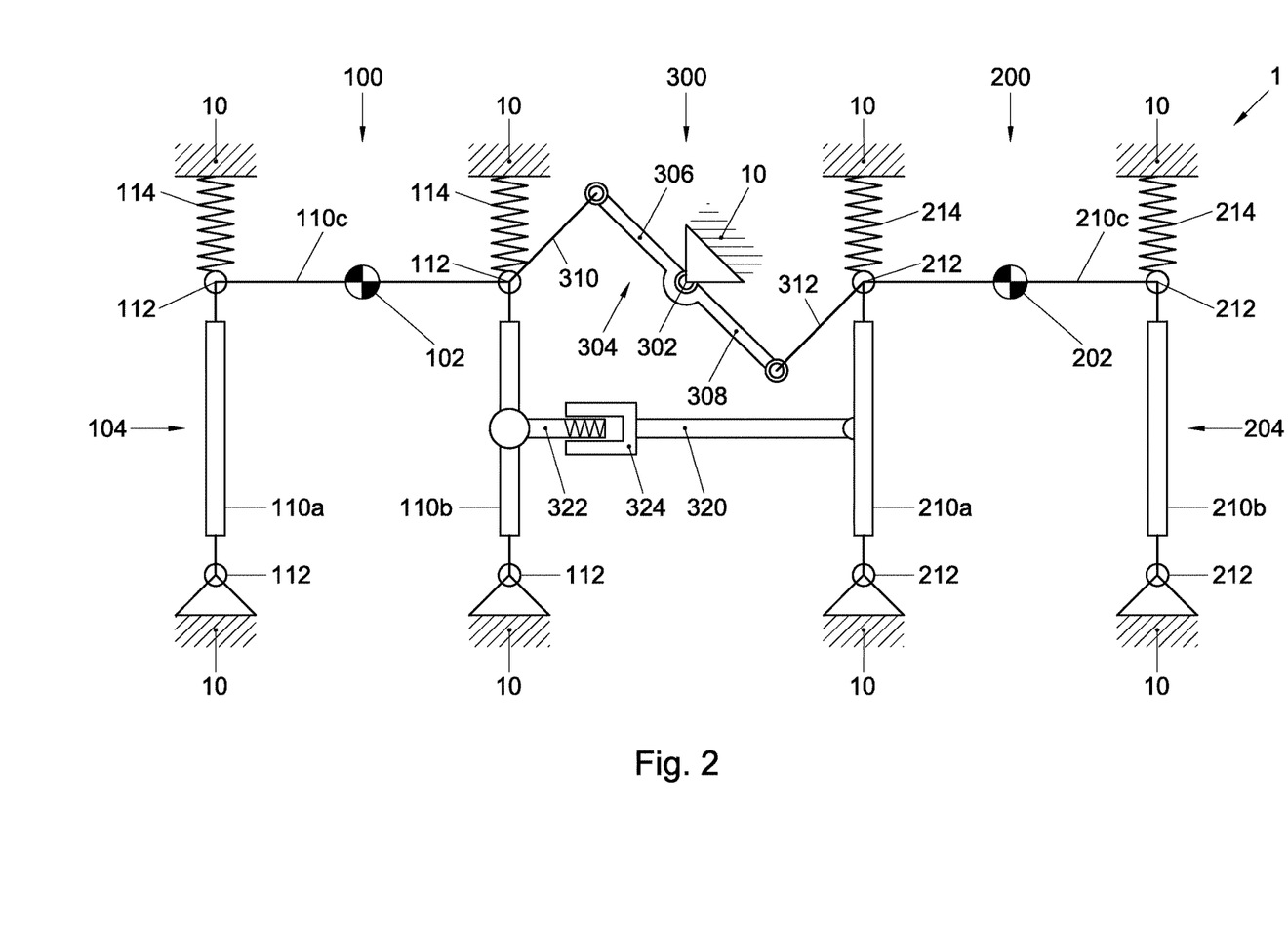
FIGS. 2-3 schematically illustrates a second exemplary embodiment of the payload transport stabilizer according to the present disclosure, based on the first exemplary embodiment.
Figure 3:
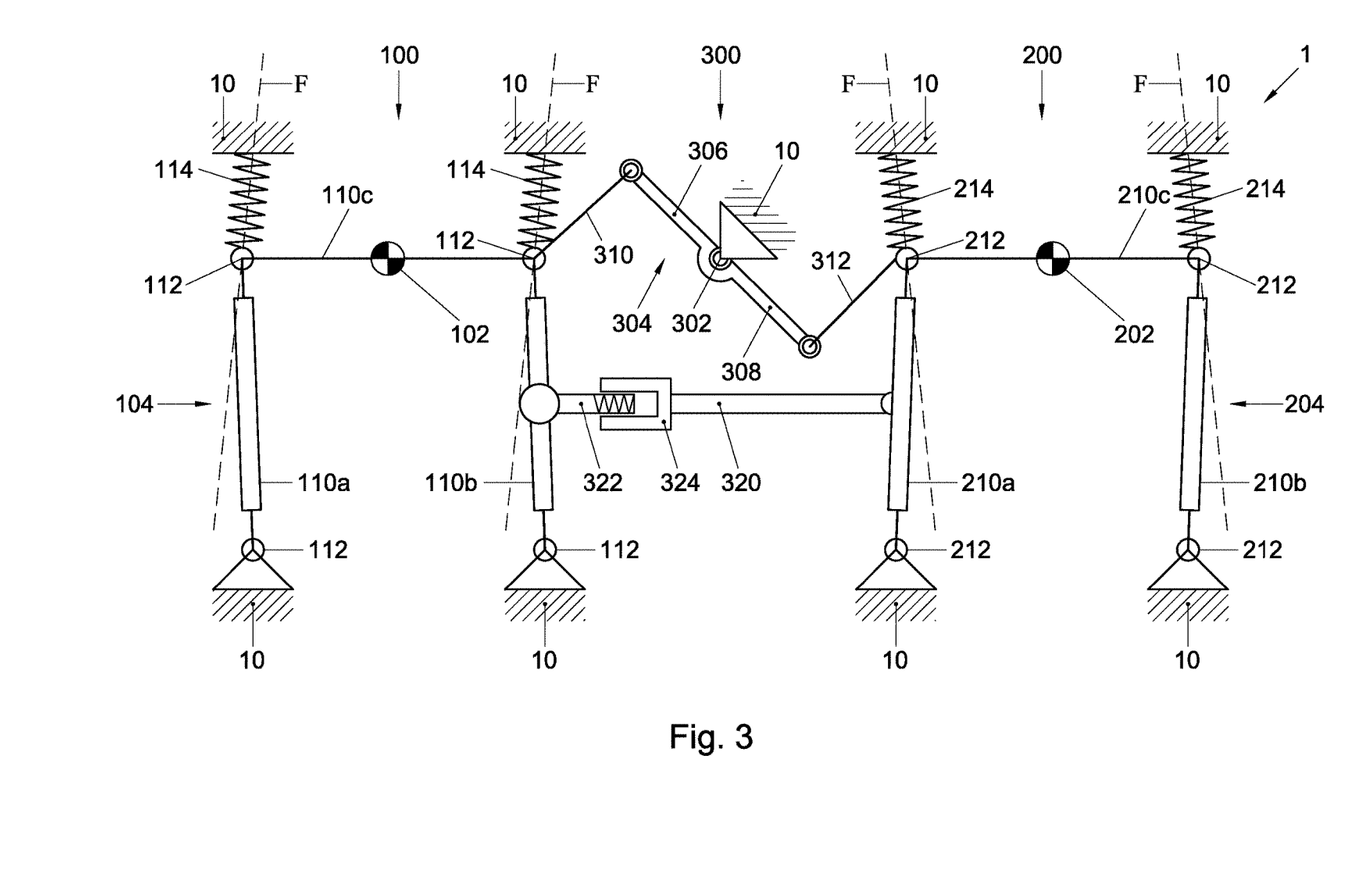
Figure 4:
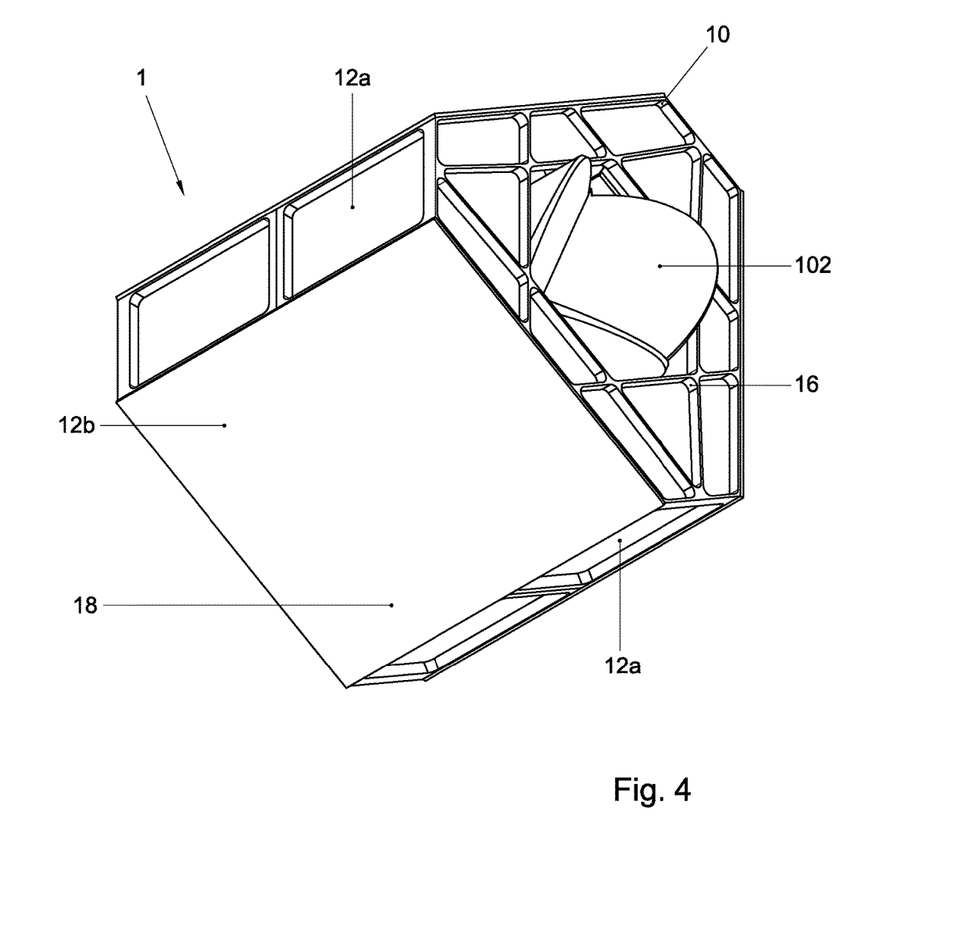
FIG. 4 schematically illustrates a perspective top view of a third exemplary embodiment of the payload transport stabilizer according to the present disclosure, wherein the coupling mechanism includes a first-class lever linkage.
Figure 5:
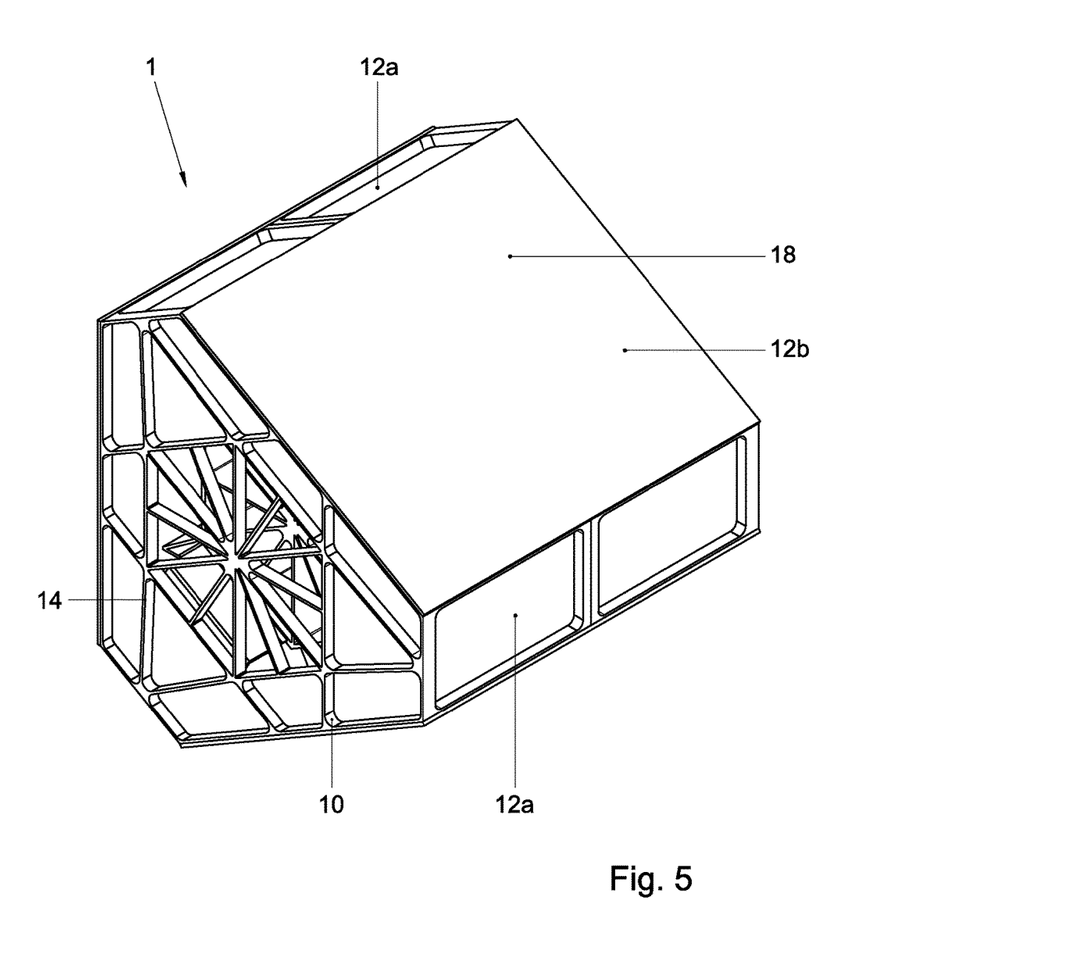
FIG. 5 schematically illustrates a perspective bottom view of the third exemplary embodiment of the payload transport stabilizer shown in FIG. 4.
Figure 6:
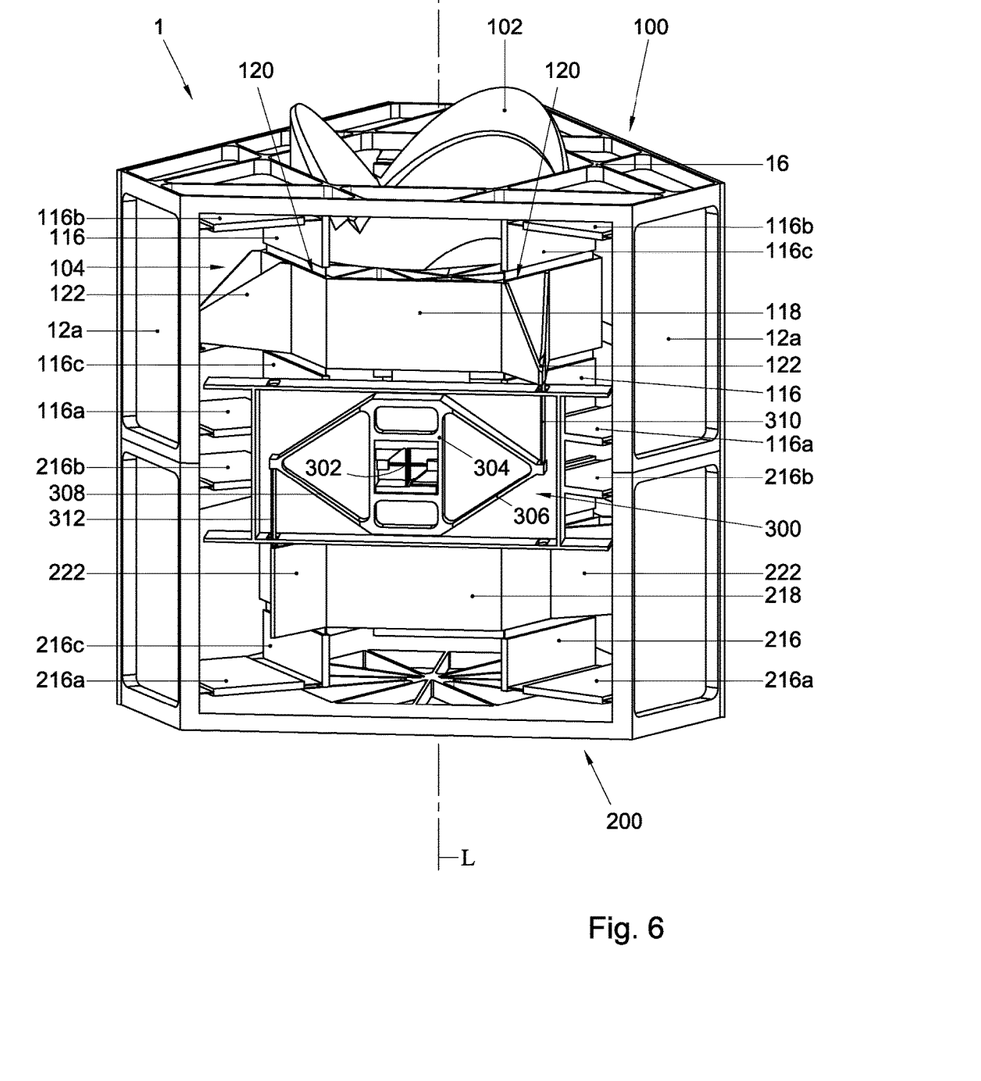
FIG. 6 schematically illustrates a perspective side view of the third exemplary embodiment of the payload transport stabilizer shown in FIGS. 4-5, wherein a side panel has been removed to make its interior visible.
Figure 7A:
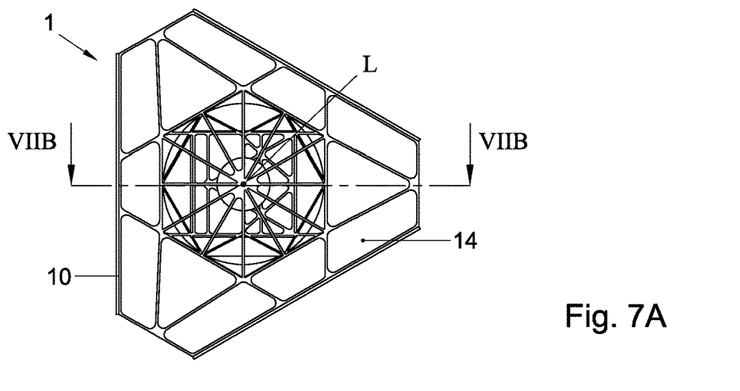
FIGS. 7A-C schematically illustrate a bottom view (A), a cross-sectional side view (B), and a cross-sectional top view (C) of the third exemplary embodiment of the of the payload transport stabilizer shown in FIGS. 4-6.
Figure 7B:
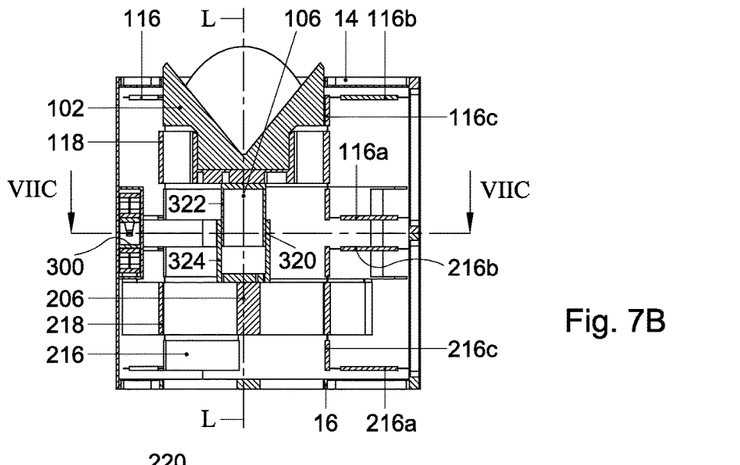
Figure 7C:
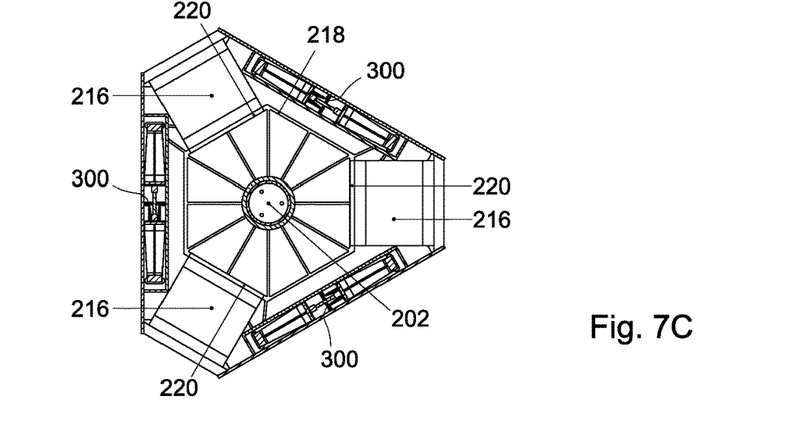

FIGS. 2 and 3 schematically illustrate the construction and operation of a second exemplary embodiment of the payload transport stabilizer 1 according to the present disclosure, based on the first exemplary embodiment shown in FIG. 1. The second exemplary embodiment of FIGS. 2-3 differs from the first exemplary embodiment in that:

(i) the hinges 112 of the payload guide 104 and balance mass guide 204 are elastic hinges, which may dissipate less energy than non-elastic hinges during a partial collapse or rearrangement of the parallelograms of the payload and balance mass guides 104, 204. The elastic hinges may be relaxed and undeformed in the initial state of equilibrium of the payload transport assembly 1 shown in FIG. 2, and thus be configured to force the payload 102 and the balance mass 202 back into this initial (and stabilized) state once they leave it.

(ii) the payload guide 104 and the balance mass guide 204 both include two counter springs 114, each connected to a respective hinged extremity of the respective third rod 110c, 210c at one end, and to the frame 10 at another end. The counter springs 114, which may typically be compressive springs, may be configured such that (the horizontal components of) the forces they exert on the third rods 110c, 210c counteract and at least partially balance out the (horizontal action of the) elastic hinges 112 thereon once the lever 304 is rotated from its rotational position shown in FIG. 1, so as to facilitate displacements of the payload 102 and the balance mass 202 along their respective guide paths.

Accordingly, the changes under (i) and (ii) may have two consequences. Firstly, the energy required to the move the payload 102 and the balance mass 202, and hence the accompanying heat dissipation, may be reduced. Secondly, by properly prestressing the counter springs 114 the eigenfrequency of the stablizer 1 may be reduced, preferably to a value smaller than 5 Hz, as a result of which it may start to act like a low-pass filter. Consequently, the transmission of external, typically higher frequency vibrations onto the payload 102 and the balance mass 202 may be diminished, which may advantageously reduce the mechanical loads to which they are subjected during operation.

(iii) it includes an electromagnetic actuator in the form of a partly telescopable actuator rod 320. The actuator rod 320 connects the second rod 110b of the payload guide 104 to the first rod 210a of the balance mass guide 204. The actuator rod 320 is hingedly connected to both said guide rods 110a, 110b, and includes a short-circuitable electric coil 322 that is slidably received in a socket-shaped permanent magnet 324. By properly powering the electric coil 322 (in an non-short-circuited state) the effective length of the actuator rod 320 may be increased and decreased, so as to rotate the guide rods 110a, 110b respectively away from one another and towards each other around their points of attachment to the frame 10. Accordingly, the payload 102 may be deliberately moved along the payload guide path 106. By short-circuiting the electric coil 322, unintentional movement of the payload 102 along the payload guide path may be buffed.

FIGS. 4-7 schematically illustrate a third exemplary embodiment of a payload transport stabilizer 1 according to the present disclosure. The Figures show a top perspective view (FIG. 4), a bottom perspective view (FIG. 5), a side view (FIG. 6), bottom view (FIG. 7A), a cross-sectional side view (FIG. 7B) and a cross-sectional top view (FIG. 7C), respectively. As will become clear below, the payload transport stabilizer 1 possesses three-fold rotational symmetry with respect to its longitudinal axis L. The symmetry applies to both the housing 10 of the assembly 1, and to its interior, i.e. the payload assembly 100, the balance mass assembly 200, and a number of first class lever-linkages 300.

The housing of the payload transport stabilizer 1 is formed by a right prismatic frame 10 with an irregular hexagonal cross-section (see FIG. 7A) defining a polygonal circumference with three long edges and three short edges of equal length, respectively, which, seen along the circumference, are connected in alternating succession. The substantially rigid frame 10 thus defines three small sides 12a (corresponding to the short edges of the polygon) and three large sides 12b (corresponding to the long edges of the polygon), which sides extend between a bottom 14 and a top 16 of the frame 10. The large sides 12b of the frame 10 may be partly formed by detachable panels 18. In the side view of FIG. 6, a side panel 18 has been removed to render the interior of the payload transport stabilizer 1 visible.

An upper half of the frame 10 accommodates the payload assembly 100, while a lower half of the frame accommodates the balance mass assembly 200. As in the first exemplary embodiment, the payload assembly 100 and the balance mass assembly 200 are essentially identical, except that the payload assembly includes a payload 102 where the balance mass assembly includes a balance mass 202. The construction of both assemblies 100, 200 is therefore discussed again in terms of the payload assembly 100. The discussion is mutatis mutandis applicable to the balance mass assembly 200, with the understanding that the reference numerals need to be increased by +100.

The payload assembly 100 comprises a payload guide 104, including three leaf springs 116 and one payload carriage 118. Each leaf spring 116 has three flat sections 116a-c that are interconnected in the form of a U (best seen in FIGS. 6 and 7B). The free ends of each of the three leaf springs 116 are fixedly connected to an inner surface of an upper part of respective small side 12a of the frame 10, such that—in a relaxed condition of the springs 116—the first and second sections 116a,b of each leaf spring 116 extend parallel to the bottom 14 and top 16 of the frame 10, while a third section 116c extends parallel to the longitudinal axis L of the payload transport stabilizer 1. The third, axially extending sections 116c of the leaf springs 116 collectively serve as a guide for the payload carriage 118, which has a regular hexagonal cross-section in a plane perpendicular to the longitudinal axis L (the hexagonal cross-section of the balance mass carriage 218 is clearly shown in FIG. 7C). To this end, every other side 120 of the six sides of the payload carriage 118 is integrated with/connected to the third section 116c of a respective leaf spring 116. The payload assembly 100 further includes a payload 102. In FIGS. 4-7, the payload is easily recognizable as a budding flower-like, triple-face mirror; its counterpart, the balance mass, is depicted as a massive cylinder (see FIG. 7C). The payload 102 is fixedly attached to the payload carriage 118, such that its center of mass is located on the longitudinal axis L of the payload transport stabilizer 1. The masses of the payload 102 and the balance mass 202 are chosen the same.

The payload transport stabilizer 1 further comprises three identical first class lever-linkages 300, each disposed at a large side 12*b* of the frame 10, precisely halfway the lower balance mass assembly 200 and the upper payload assembly 100. Each first class-lever linkage 300 includes a lever 304 that is rotatably connected to the frame 10 through a fulcrum 302 and that defines a (triangular) payload arm 306 and a (triangular) balance arm 308. The payload arm 306 and the balance arm 308 are symmetrical relative to the fulcrum 302. An outer, free extremity of the payload arm 306 is mechanically linked to one of three connectors 122 on the payload carriage 118 by means of a link rod 310 that hingedly connects to both the payload arm 306 and the connector 122. An outer, free extremity of the balance arm 308 is similarly linked to one of three connectors 222 on the balance mass carriage 218 by means of a link rod 312 that hingedly connects to both the balance arm 308 and the connector 222.

The first class lever-linkages 300 couple the position and motion of the payload 102 to the position and motion of the balance mass 202. Turning the levers 304 counterclockwise from their depicted rotational positions (see FIG. 6) around their fulcrums 302, for example, will cause the payload 102 and the balance mass 202 to rectilinearly move away from one another along the longitudinal axis L of the payload transport stabilizer 1, which, insofar as the payload guide 104 and the balance mass guide 204 allow movement along the longitudinal axis L, coincides with both the payload and balance mass guide path 106, 206. Alternatively turning the levers 304 clockwise will cause the payload 102 and the balance mass 202 to rectilinearly move towards one another along the longitudinal axis L. It is noted that movement of the payload 102 and the balance mass 202, either away from each other or towards each other, does not change the center of mass of the payload transport stabilizer 1. The configuration of the payload transport stabilizer 1 is such that its center of mass is located on the longitudinal axis L, at the point where the rotational axes of the levers 304 intersect each other.

The operation of the third embodiment of the payload transport stabilizer 1 is generally the same as that of the first embodiment discussed with reference to FIG. 1, beit that (i) the leaf springs 116, 216 deform elastically when the payload 102 and balance mass 202 move from their respective initial positions (in which the payload transport stablizer 1 is in mechanical equilibrium), so as to urge the payload 102 and balance mass 202 back therein, and (ii) its configuration is such that all positions of the levers 304 relative to the frame 10 define respective stabilized states in which both translational accelerations and rotational acceleration around the center of mass of the payload transport stabilizer 1 cause the payload 102 and the balance mass 202 to exert moments of equal magnitude and opposite direction on the respective levers 304 (around their respective fulcrums), thus preventing movement of the payload 102 along the payload guide path 106.

Like the first exemplary embodiment of the payload transport stabilizer, the third exemplary embodiment may also be expanded with (i) auxiliary counter springs 114 and/or (ii) an actuator system. As regards (i), the counter springs may extend between the frame 10 and the carriage 118 of the payload guide 104 and the balance mass carriage 218 of the balance mass guide 204, respectively. As regards (ii), the actuator system may, for example, include a partly telescopable actuator or guide rod 320, including two magnetic sections 322, 324, at least one of which is capable of generating a variable magnetic field so as to effect attraction and repulsion between them (see FIG. 7B).

Figure 8:
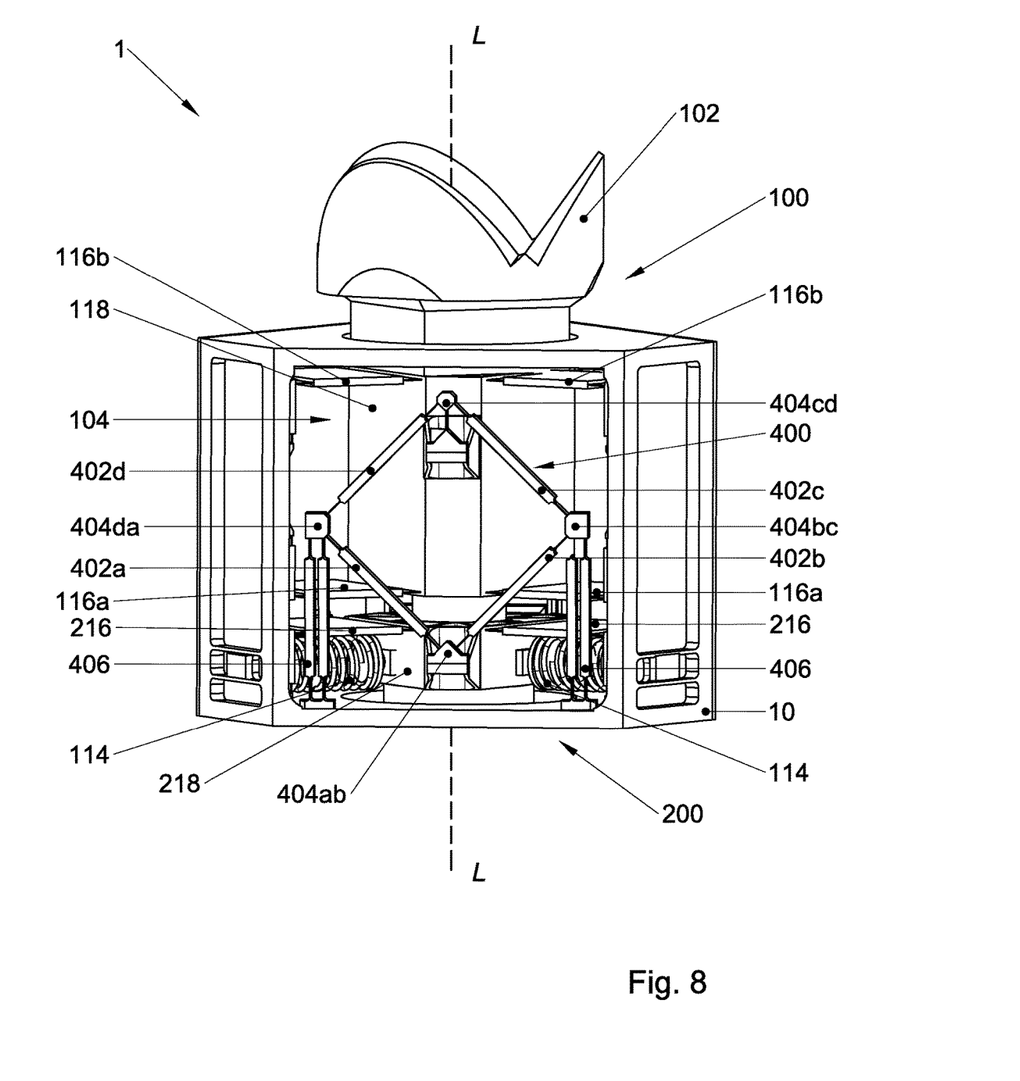
FIG. 8 schematically illustrates a perspective side view of a fourth exemplary embodiment of the payload transport stabilizer according to the present disclosure, wherein the coupling mechanism includes a parallelogram linkage.

FIG. 8 schematically illustrates a perspective side view of a fourth exemplary embodiment of the payload transport stabilizer 1 according to the present disclosure. The fourth exemplary embodiment is a modified version of the third exemplary embodiment discussed above with reference to FIGS. 4-7. The modifications include (i) the replacement of each of the three first class-lever linkgages 300 of the coupling mechanism by a parallelogram linkage 400, and (ii) replacement each of the three three-section leaf springs 216 with a single-section leaf spring 216 and a mechanical counter spring 114 of the coil-type. The single-section leaf spring 216 and the mechanical counter spring 114 extend in parallel, each having one end that is connected to the frame 10 and other end that engages the balance mass carriage 218. The counter springs 114 essentially serve the same purpose as the counter springs 114 in the second exemplary embodiment described above with reference to FIGS. 2 and 3—i.e. they help reduce the eigenfrequency of the stabilizer 1, and in addition partly balance the axial forces caused by elastic deformation of the leaf springs 116, 216 and the elastic hinge joints 404 so as to facilitate the movement of the the payload 102 and balance mass 202 along their respective guide paths 106, 206 by an actuator—, and will therefore not be elaborated upon here again.

It will be clear that the coupling mechanism of the payload transport stabilizer 1 of the fourth exemplary embodiment includes three identical parallelogram linkages 400, one of which is clearly visible in FIG. 8. Each parallelogram linkage 400 includes four links 402*a-d* that are interconnected by elastic hinge joints 404*ab*, 404*bc*, 404*cd* and 404*da*. To restrict the overall mass of the coupling mechanism, the links 402*a-d* are formed by leaf springs with a thickened center portion. The joints 404*cd* and 404*ab* of a first pair of opposite joints are respectively connected to the payload carriage 118 and the balance mass carriage 218, and hence respectively to the payload 102 and the balance mass 202. The joints 404*da*, 404*bc* of a second pair of opposite joints are movably connected to the frame 10 by means of respective frame links 406, each of which comprises two parallel leaf springs with thickened center portions. Like the first class-lever linkgages 300 they replace, the parallelogram linkages 400 ensure that the motions (and positions) of the payload 102 and the balance mass 202 are oppositely coupled.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 payload transport stabilizer
10 frame
12a,b small (a) and large (b) sides of frame
14 bottom of frame
16 top of frame
18 detachable side panel
100 payload assembly
102 payload
104 payload guide
106 payload guide path
110a,b,c payload guide rods
112 optionally elastic hinge
114 counter spring
116a,b,c leaf spring 116, having flat sections a,b,c
118 payload carriage
120 side of payload carriage connected to leaf spring
122 connector on payload carriage
200 balance mass assembly
202 balance mass
204 balance mass guide
206 payload guide path
210a,b,c balance mass guide rods
212 hinge
214 spring
216a,b,c leaf spring, having flat sections a,b,c
218 balance mass carriage
220 side of balance mass carriage connected to leaf spring
222 connector on balance mass carriage
300 first class lever-linkage
302 fulcrum
304 lever
306 payload arm
308 balance arm
310 link rod between payload arm and payload
312 link rod between balance arm and balance mass
320 actuator rod
322 coil
324 permanent magnet
400 parallelogram linkage
402a-d optionally elastic links of parallelogram linkage
404ab, . . . optionally elastic hinge joint between links a and b
406 optionally elastic frame link
L longitudinal axis of payload transport stabilizer

I claim:

1. A payload transport stabilizer, comprising:
a frame;
a payload assembly, including a payload guide that is connected to the frame and that defines a payload guide path, and a payload that is connected to the payload guide such that it is moveable along the payload guide path;
a balance mass assembly, including a balance mass guide that is connected to the frame and that defines a balance mass guide path, and a balance mass that is connected to the balance mass guide such that it is moveable along the balance mass guide path;
a coupling mechanism that interconnects the payload and the balance mass, such that positions of the payload and the balance mass along their respective guide paths are mutually coupled;
the payload transport stabilizer being configured such that it can occupy at least one stabilized state, defined by a combination of a first position of the payload along the payload guide path and a corresponding first position of the balance mass along the balance mass guide path, wherein the payload is movable along the guide path in a first direction, from its first position to a second position, wherein the coupling mechanism is configured to move the balance mass in a second direction that is opposite to said first direction when the payload moves in the first direction, and wherein the coupling mechanism comprises a lever linkage including a lever that is rotatably connected to the frame through a fulcrum and that defines a payload arm and a balance arm, wherein the payload arm is linked to the payload and the balance arm is linked to the balance mass.

2. The payload transport stabilizer according to claim 1, configured such that a continuous range of positions of the payload along the payload guide path corresponds to a continuum of mutually different stabilized states, each uniquely characterized by a combination of a position of the payload along the payload guide path and a corresponding position of the balance mass along the balance mass guide path.

3. The payload transport stabilizer according to claim 2, wherein a position of a combined center of mass of the payload and the balance mass relative to the frame is substantially the same for any two stabilized states of said continuum of stabilized states.

4. The payload transport stabilizer according to claim 1, wherein, in the at least one stabilized state, a payload movement direction extends tangent to the payload guide path at the position of the payload, and
wherein during operation an acceleration of the frame includes translational accelerations perpendicular to said payload movement direction.

5. The payload transport stabilizer according to claim 1, wherein the payload and the balance mass have a substantially same mass.

6. The payload transport stabilizer according to claim 5, wherein the payload guide path and the balance mass guide path are linear.

7. The payload transport stabilizer according to claim 6, wherein the payload guide path and the balance mass guide path extend in parallel or in alignment.

8. The payload transport stabilizer according to claim 1, further including an actuator configured to effect movement of the payload along the payload guide path.

9. The payload transport stabilizer according to claim 8, wherein the actuator includes a permanent magnet and a short-circuitable electric coil.

10. The payload transport stabilizer of claim 8, wherein the actuator is an electromagnetic actuator.

11. A payload transport stabilizer, comprising:
a frame;
a payload assembly, including a payload guide that is connected to the frame and that defines a payload guide path, and a payload that is connected to the payload guide such that it is moveable along the payload guide path;
a balance mass assembly, including a balance mass guide that is connected to the frame and that defines a balance mass guide path, and a balance mass that is connected to the balance mass guide such that it is moveable along the balance mass guide path;
a coupling mechanism that interconnects the payload and the balance mass, such that positions of the payload and the balance mass along their respective guide paths are mutually coupled;
the payload transport stabilizer being configured such that it can occupy at least one stabilized state, defined by a combination of a first position of the payload along the payload guide path and a corresponding first position of the balance mass along the balance mass guide path, wherein the payload is movable along the guide path in a first direction, from its first position to a second position, wherein the coupling mechanism is configured to move the balance mass in a second direction that is opposite to said first direction when the payload moves in the first direction, and wherein the at least one stabilized state includes an initial stabilized state in which the payload transport stabilizer is in mechanical equilibrium, and wherein at least one of the payload assembly, the balance mass assembly and the coupling mechanism includes at least one elastically deformable element that is deformed when the payload moves from its position along the payload guide path associated with the initial stabilized state, such that the elastically deformed element urges the payload back into its position associated with the initial stabilized state.

12. A payload transport stabilizer, comprising:
a frame;
a payload assembly, including a payload guide that is connected to the frame and that defines a payload guide path, and a payload that is connected to the payload guide such that it is moveable along the payload guide path;
a balance mass assembly, including a balance mass guide that is connected to the frame and that defines a balance mass guide path, and a balance mass that is connected to the balance mass guide such that it is moveable along the balance mass guide path;
a coupling mechanism that interconnects the payload and the balance mass, such that positions of the payload and the balance mass along their respective guide paths are mutually coupled;
the payload transport stabilizer being configured such that it can occupy at least one stabilized state, defined by a combination of a first position of the payload along the payload guide path and a corresponding first position of the balance mass along the balance mass guide path, wherein the payload is movable along the guide path in a first direction, from its first position to a second position, wherein the coupling mechanism is configured to move the balance mass in a second direction that is opposite to said first direction when the payload moves in the first direction, and wherein, in the at least one stabilized state, a payload movement direction extends tangent to the payload guide path at the position of the payload, and wherein during operation an acceleration of the frame includes translational accelerations parallel to said payload movement direction.

13. A payload transport stabilizer, comprising:
a frame;
a payload assembly, including a payload guide that is connected to the frame and that defines a payload guide path, and a payload that is connected to the payload guide such that it is moveable along the payload guide path;
a balance mass assembly, including a balance mass guide that is connected to the frame and that defines a balance mass guide path, and a balance mass that is connected to the balance mass guide such that it is moveable along the balance mass guide path;

a coupling mechanism that interconnects the payload and the balance mass, such that positions of the payload and the balance mass along their respective guide paths are mutually coupled;
the payload transport stabilizer being configured such that it can occupy at least one stabilized state, defined by a combination of a first position of the payload along the payload guide path and a corresponding first position of the balance mass along the balance mass guide path, wherein the payload is movable along the guide path in a first direction, from its first position to a second position, wherein the coupling mechanism is configured to move the balance mass in a second direction that is opposite to said first direction when the payload moves in the first direction, and wherein during operation an acceleration of the frame includes rotational accelerations around a combined center of mass of the payload and the balance mass.

14. A vehicle including a payload transport stabilizer, the payload transport stabilizer comprising:
a frame;
a payload assembly, including a payload guide that is connected to the frame and that defines a payload guide path, and a payload that is connected to the payload guide such that it is moveable along the payload guide path;
a balance mass assembly, including a balance mass guide that is connected to the frame and that defines a balance mass guide path, and a balance mass that is connected to the balance mass guide such that it is moveable along the balance mass guide path;
a coupling mechanism that interconnects the payload and the balance mass, such that positions of the payload and the balance mass along their respective guide paths are mutually coupled;
the payload transport stabilizer being configured such that it can occupy at least one stabilized state, defined by a combination of a first position of the payload along the payload guide path and a corresponding first position of the balance mass along the balance mass guide path, wherein the payload is movable along the guide path in a first direction, from its first position to a second position, wherein the coupling mechanism is configured to move the balance mass in a second direction that is opposite to said first direction when the payload moves in the first direction.

15. The vehicle according to claim 14, wherein the coupling mechanism includes a parallelogram linkage, including four links connected in a loop by four joints, wherein the joints of a first pair of opposite joints are respectively connected to the payload and the balance mass, while the joints of a second pair of opposite joints are movably connected to the frame.

16. The vehicle according to claim 14, wherein the coupling mechanism comprises a lever linkage including a lever that is rotatably connected to the frame through a fulcrum and that defines a payload arm and a balance arm, wherein the payload arm is linked to the payload and the balance arm is linked to the balance mass.

17. A method for stabilizing a payload in a vehicle according to claim 14, wherein the vehicle is a spacecraft, the method including:
accelerating the spacecraft,
exerting forces on the coupling mechanism, by each of the payload and the balance mass, as a result of the acceleration of the spacecraft, wherein said forces counteract each other.

18. A method according to claim 17, wherein, in the at least one stabilized state, a payload movement direction extends tangent to the payload guide path at the position of the payload, and wherein said acceleration of the spacecraft includes translational accelerations parallel to said payload movement direction.

19. The method according to claim 17, wherein, in the at least one stabilized state, a payload movement direction extends tangent to the payload guide path at the position of the payload, and wherein said acceleration of the spacecraft includes translational accelerations perpendicular to said payload movement direction.

20. The method according to claim 17, wherein said acceleration of the spacecraft includes rotational accelerations around a combined center of mass of the payload and the balance mass.

21. The vehicle of claim 14, wherein the vehicle is a spacecraft.

22. The method of claim 17, wherein the forces on the coupling mechanism cancel each other out.

\* \* \* \* \*